June 29, 1954     J. K. DAVIS     2,682,197

FOLDED REFLECTING OPTICAL SYSTEM OF THE SCHMIDT TYPE

Filed Aug. 13, 1951     2 Sheets-Sheet 1

INVENTOR
JOHN K. DAVIS
BY
Louis L. Gagnon
ATTORNEY

June 29, 1954     J. K. DAVIS     2,682,197
FOLDED REFLECTING OPTICAL SYSTEM OF THE SCHMIDT TYPE
Filed Aug. 13, 1951     2 Sheets—Sheet 2

INVENTOR
JOHN K. DAVIS
BY
ATTORNEY

Patented June 29, 1954

2,682,197

UNITED STATES PATENT OFFICE 2,682,197

FOLDED REFLECTING OPTICAL SYSTEM OF THE SCHMIDT TYPE

John K. Davis, Springdale, Conn., assignor to American Optical Company, Southbridge, Mass., a voluntary association of Massachusetts Application August 13, 1951, Serial No. 241,671

15 Claims. (Cl. 88—57)

This invention relates to improvements in optical systems and has particular reference to novel, simple and inexpensive optical systems of the reflective type and method of making the same.

It is a primary object of this invention to provide an improved folded reflecting optical system of a small compact nature for reflecting radiant energy between two points located in spaced relation with one another, and method of making the same.

Another object is to provide an improved reflective type optical system wherein both the receiving area and the object area are located outside the system.

Another object is to provide an optical system of the above character wherein the projected radiant energy will be more uniformly distributed throughout a given controlled area.

Another object is to provide an improved optical system of the above character which is simple in construction and wherein the elements comprising the system are simply supported and aligned by conventional means which need not extend into the system in such a manner as to mask out any substantial amount of the radiant energy being projected.

Another object is to provide an improved projection type optical system of the folded type for use in magnifiers, microscopes, telescopes, cameras, television and the like, and wherein color wheels, films or other articles may be inserted in front of the object area or receiving area without masking out any of the radiant energy passing between said areas.

Still another object is to provide an optical system of the folded type for reflecting light rays from an object area to an image receiving area and wherein substantially no light is projected directly from the object area to the image receiving area, resulting in reduction in scattered light and consequent increase in contrast in the resultant image.

Another object is to provide a coaxial optical system embodying an object area for directing a beam of radiant energy onto a spherical reflector, a substantially flat reflector between the spherical reflector and object area for receiving the beam reflected from the spherical reflector and projecting it through a central aperture in the spherical reflector to a receiving area, and means intermediate said reflectors for masking out the major part of the central portion of the beam which would be transmitted directly without reflection from said object area to the receiving area whereby an annular beam will result and the portion of said beam reflected from one reflecting surface to the other will have a maximum cross sectional dimension, at a plane intermediate said reflecting surfaces, larger than the maximum cross-sectional dimension of the portions of said beam passing between said respective reflecting surfaces and said areas.

Other objects and advantages of the invention will become apparent from the following description taken in connection with the accompanying drawings, in which.

Figure 1:
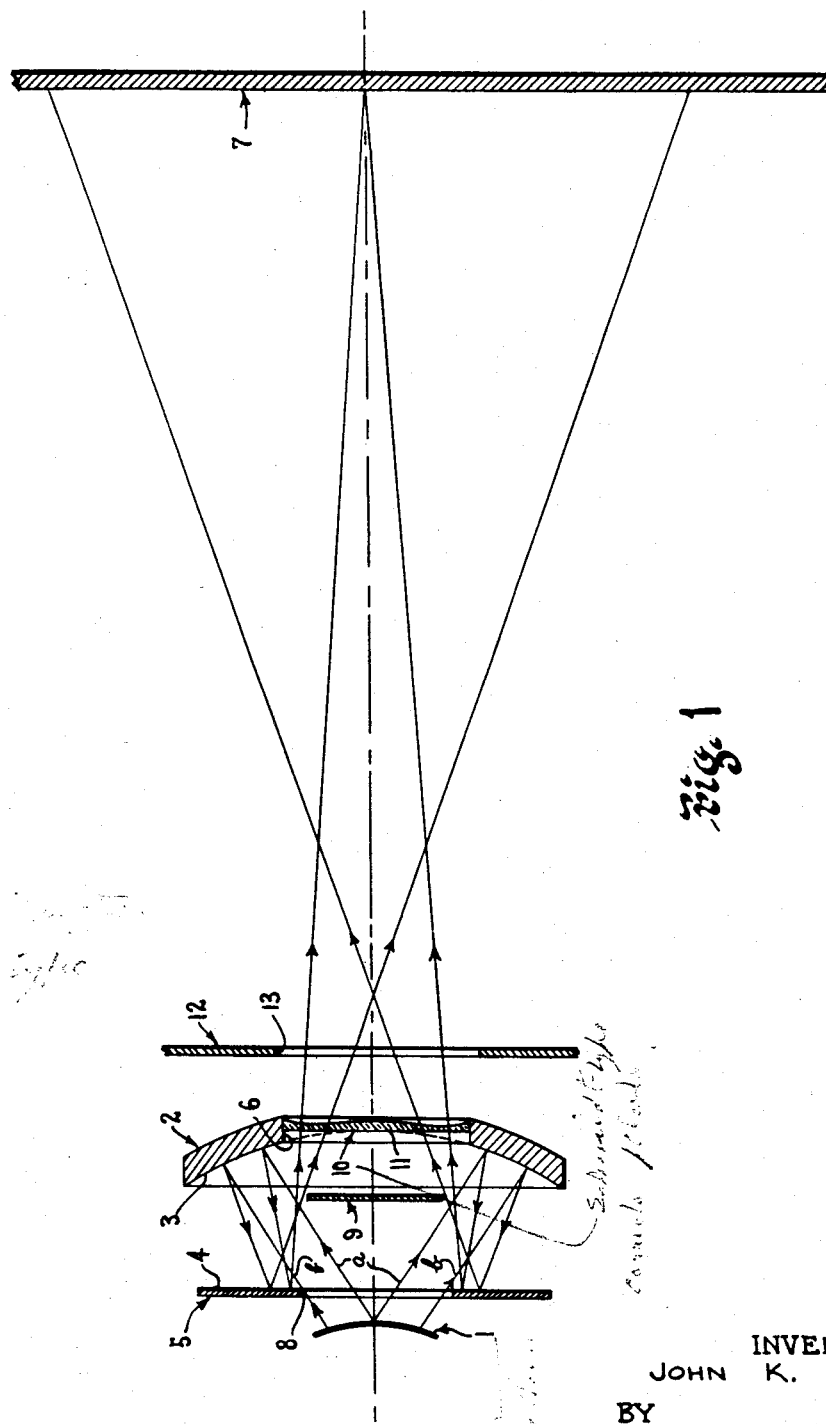
Fig. 1 illustrates a preferred embodiment of the invention.

Referring more particularly to the drawing, numeral 1 (Fig. 1) designates an object area, which may be of any type such as the fluorescent screen of a cathode ray tube film of a projector, or other similar object to be projected. Radiant energy emanating from the object area 1 falls upon a reflector 2 having a spherical concave reflecting surface 3 directed toward the object area 1 and from which the energy is reflected back onto the reflective surface 4 of a flat reflector 5 which in turn reflects the energy through an opening 6 in the center of the reflector 2 to a receiving area 7 located at a predetermined distance from the spherical reflector 2. The flat reflector 4 is positioned slightly in front of the object area 1 and is provided with a central opening 8 preferably slightly larger than the diameter of the object area 1 and substantially coaxial therewith. The opening 6 in the spherical reflector 2 is also coaxially aligned with the center of the object area 1. To prevent energy from passing directly from the object area 1 through the opening 6, between the spherical reflector 2 and receiving area 7 and on the axis of the system there is provided a baffle 9 of a controlled size and shape. The baffle 9 is preferably non-transparent as well as non-reflective which, thereby, also prevents reflection of the energy back onto the object area 1.

Within the opening 6 of the spherical reflector 2 is positioned a correcting element 10 such as a Schmidt plate having its flat surface 11 directed toward the object area 1. Thus, in the case of light rays which, for example, are being directed onto the image receiving area 7 from a cathode ray tube or the like, as indicated by the object area 1, the light rays are corrected for aberrations, such for example, as spherical and chromatic aberrations, as they are reflected to the image area 7 by the reflecting surface 4 of the flat reflector 5.

A diaphragm 12 having an aperture 13 therein is preferably located adjacent the convex side of the spherical reflector 2 to prevent undesirable transmission of extraneous peripheral light into the system with consequent decrease in contrast of the resultant image formed at the receiving area 7.

It is known that in most optical systems of the so-called "reflective" type for projection of light rays, an image is produced wherein the central portion is of greater brightness and possesses better contrast discrimination than the marginal areas. This is due to many causes, among them being the fact that in conventional systems the devices used for supporting the parts of the system in position of use generally are interposed in the path of the light rays with consequent reduction in the amount of light eventually reaching the image area. The present invention overcomes this detrimental factor by the provision of a simple and efficient optical system which can be mounted by simple conventional means, which means need not be interposed in the path of the light rays or other form of radiant energy being reflected.

Greater contrast discrimination is also obtained due to the fact that the baffle 9 prevents transmission of light rays directly from the object area 1 to the receiving area 7 with consequent elimination of bright areas in the central portion of the resultant image.

An optical system constructed in this manner is also very compact and, therefore, adaptable to a wider range of uses than bulky prior art systems. An example of an efficient system particularly well adapted for use in a television receiving device and of the type shown in Fig. 1 is as taught in Table A which follows and which gives approximate radii, thickness, diameters and distances:

Table A

| Radii | Thickness | Diameter | Distance, mm. |
|---|---|---|---|
| 1=5.75" front<br>5.625" rear<br>3=279.4 mm. | 1=.125" | 1=4"<br>8=156 mm.<br>2=12"<br>6=181 mm.<br>13=164 mm.<br>5=11" | 1 to 4=16.7<br>4 to 9=91.5<br>9 to 11=45<br>1 to 11=153.2<br>10 to 7=622<br>2 to 12=42.4 |

It will be noticed that in the system of Fig. 1 the correcting element 10 is located within the opening 6 in the spherical mirror 2 and is positioned substantially at the vertex of the reflecting surface. However, since in some other systems the various elements are spaced differently with respect to one another, the correcting element or elements are described herein as being in most cases adjacent the vertex of the reflecting surface.

Systems as described above and shown in Fig. 1 are also very efficient for use in microscopes, magnifiers, etc. However, it is to be understood that the same systems can be used for telescopes and photography by using the receiving area 7 as an object area and, in the case of a camera, inserting a film behind the flat mirror 5 as the image plane, in which case the film becomes the receiving area.

In the latter case it is clear that such a film will not extend into the path of light in such a manner as to render the device inefficient.

In the case of a television projection system it is readily apparent that a color wheel can be inserted between the cathode ray tube face or object area 1 and the flat reflector 5 without acting in any way to reduce the amount of light being reflected by the reflectors 2 and 4 to the receiving area 7 as is the case in some prior art folded systems.

It is particularly pointed out that although the use of two reflectors for folding an optical path upon itself is conventional, the presently described method of providing the reflectors with apertures for permitting entrance and exit of radiant energy therethrough as described has been found to produce considerable improvement not only in the resultant imagery obtained but also because of the fact that by structurally forming the system as described the overall space requirements are considerably decreased.

It will be particularly noted that in accordance with this invention a beam of radiant energy is first directed from a point source on the object area as an annular beam "a" or "b" (Fig. 1) onto one of the reflectors, and is then reflected similarly onto the second reflector, from which it passes to the opposed receiving area and is imaged as an enlarged or reduced point source depending upon the direction of travel of the beam. Accordingly, the annular beam as reflected by one reflector to the other will always have an outer maximum cross sectional dimension, at a plane intermediate said reflectors, which is larger than the maximum cross sectional dimension in the same plane of the beam as either reflected by a reflector to the receiving area or as projected by the object area onto a reflector.

A still further differentiation of the presently described device is that all of the elements of the system are located substantially on a single geometric axis, which geometric axis is also the optical axis. This is desirable but as accomplished by the prior art has been found impractical due to the resultant bulk and inefficiency of such systems. However, by forming the system in accordance with the present invention such prior art difficulties have been overcome.

Figure 2:
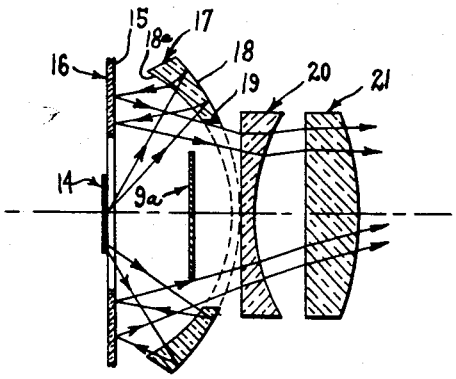
Figs. 2, 3 and 4 illustrate modifications of the invention.

Another optical system embodying the present invention is shown in Fig. 2 wherein the object area 14 is located more closely to the reflecting surface 15 of the flat reflector 16 and projects a beam through a curved refractive surface 18a upon a spherical reflector 17 which reflects the beam from its rear surface 18 back through said curved frontal surface 18a onto the flat reflector 16, from the suface 15 of which the beam is projected through an aperture 19 in the reflector 17 and through correcting means consisting of two refracting elements 20 and 21 to a receiving area not shown. In such a system, when the components are properly shaped and spaced, very good results are obtained, not only with respect to correction of chromatic and spherical aberrations but also ratios of apertures of approximately 1:1 in a field of view of approximately 10° and more. It is important to note, however, that the correcting means 20—21 is located at or adjacent to the vertex of the reflecting surface 18 of the curved reflector 17.

Figure 3:
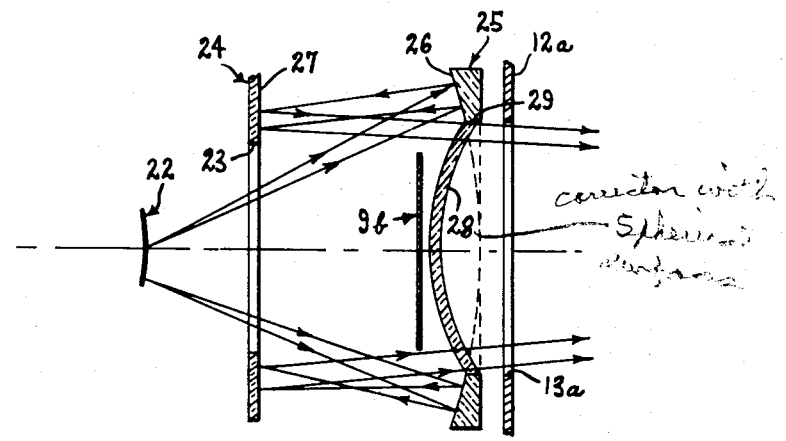

A further illustration of the present invention applied to a somewhat modified projection optical system of the reflective-refractive type is shown in Fig. 3 wherein a beam of radiant energy emanating from an object area 22 projects through an aperture 23 in a flat reflector 24 onto a spherical reflector 25 the reflecting surface 26 of which reflects the beam back onto the reflecting surface 27 of the flat reflector 24 which in turn reflects the beam through a correcting lens 28 to the receiving area (not shown). In this example the correcting lens 28 is a spherical lens having parallel curved surfaces and is positioned with its periphery within the aperture 29 in the reflector 25 with its convex surface directed toward the object area 22. With an optical system of this type a sharp enlarged image of a comparatively small field can be formed with a high luminous intensity. In the case of a reversed direction of travel of the beam, of course, a sharp reduced image of a large field is obtained.

Figure 4:
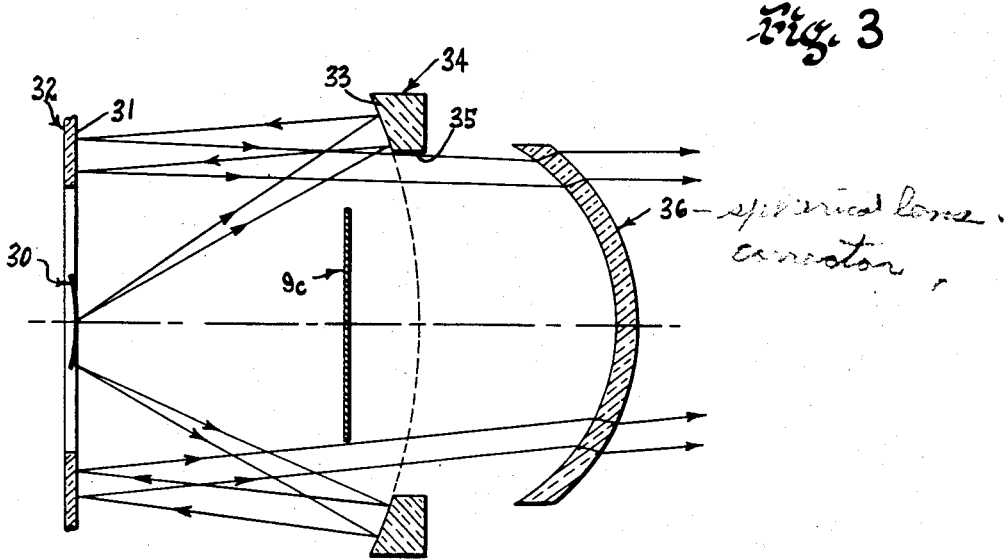

A still further example of the present invention as applied to a concentric optical system is shown in Fig. 4 wherein an object area 30, which in this case is located with its vertex substantially in the plane of the reflecting surface 31 of a flat reflector 32, projects a beam of radiant energy upon the spherical reflecting surface 33 of a curved reflector 34 from which it is directed back onto the surface 31 of the flat reflector 32 which in turn reflects them through an aperture 35 in reflector 34 and through a correcting element 36 to a receiving area (not shown). The correcting element 36 in this case is a spherical lens having parallel surfaces which is located adjacent the vertex of the reflecting surface of the curved reflector 34 with its concave surface directed toward the object area 30.

It is to be noted that in all of the systems of Figs. 1 through 4 a baffle 9, 9a, 9b and 9c respectively is shown diagrammatically as preventing direct transmission of radiant energy between the object area and receiving area. However, the luminous intensity of the marginal portions of an image can be and is increased by decreasing slightly the diameter of the baffles 9—9c wherein a slight amount of energy from the edge of the object area will be permitted to pass directly to the receiving area. The baffles 9—9c are controlled as to contour shapes so as to simulate the contour shapes of the object and image areas and further increase the efficiency of the systems in that the illumination of the marginal areas of the image is increased. Accordingly, the contour shape of the apertures 13 and 13a in the respective diaphragms 12 and 12a may likewise be controlled.

It is also to be noted particularly that in each of the systems of Figs. 1 through 4, the radiant energy emanating from an object area will pass to a first reflector in a substantially straight line, and after reflection onto a second reflector will pass from the second reflector to the receiving area along a substantially straight line. This is important since by forming an optical system as described, the use of additional reflectors has been obviated. Also in each system illustrated and described the radius of the portion of the annular beam reflected by one reflector onto the other reflector has a maximum cross sectional dimension at a plane intermediate the reflectors larger than the maximum cross sectional dimension in said plane of those portions of the beam which pass between the reflecting surfaces and the respective object and receiving areas.

It is to be understood that in the manufacture of an optical system of the presently described type, since the object area and receiving area are both outside the optical system, the major components of the system, that is the reflectors, baffle, and diaphragm, can be easily assembled as a simple unitary dust sealed unit, the parts of which can be initially adjusted at assembly, such units being easily stored and eventually sold as separate items if desired.

It is apparent from the foregoing description that an improved folded optical system of the reflective type has been made in accordance with the teachings of the present invention.

It will also be apparent that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. A reflecting optical system arranged along an optical axis for use with an object area of a given angular size and a receiving area of a given angular size, said system including only two substantially coaxially aligned spaced reflectors comprising a concave reflector and a flat reflector facing each other and each having a reflecting surface facing a respective area, one of said reflectors being formed to receive an unreflected beam of radiant energy in a substantially single direction from one of said areas and to reflect an annular portion of said beam to the other of said reflectors, the other of said reflectors being formed to reflect said annular beam in a substantially single direction to said other area, each of said reflectors having a central opening therein through which said beam is directed and each further having its respective reflecting surface for reversing the annular portion of the beam therebetween positioned with respect to the optical axis of the system such that the annular beam reflected from one reflecting surface to the other will have a maximum cross sectional dimension, at a plane intermediate said reflecting surfaces, which is larger than the maximum cross sectional dimension, in said plane, of those portions of the beam which pass between said respective reflecting surfaces and said areas, and opaque contoured baffle means positioned on the optical axis intermediate said reflectors for masking out the major portion of the center of the beam which would pass directly without reflection from one area to the other.

2. A reflecting optical system arranged along an optical axis for use with an object area of a given angular size and a receiving area of a given angular size, said system including two spaced coaxially aligned reflectors comprising a concave reflector and a flat reflector facing each other and each having a reflecting surface facing a respective area, one of said reflectors being so formed as to receive an unreflected beam of radiant energy from one of said areas and to reflect an annular portion of said beam to the other of said reflectors, the other of said reflectors being formed to reflect said annular beam to said other area, each of said reflectors having a central opening therein through which said beam is directed and each further having its respective reflecting surface for reversing the annular portion of the beam therebetween positioned with respect to the optical axis of the system such that the annular beam reflected from one reflecting surface to the other will have a maximum outer radius, at a plane intermediate said reflecting surfaces, larger than the maximum outer cross-sectional radius, in said plane, of those portions of the beam which pass between said respective reflecting surfaces and said areas, and opaque contoured baffle means positioned on the optical axis intermediate said reflectors for masking out the major portion of the center of the beam which would pass directly without reflection from one area to the other.

3. A reflecting optical system arranged along an optical axis for use with an object area of a given angular size and a receiving area of a given angular size, said system embodying two air spaced reflectors comprising a concave reflector and a flat reflector facing each other each having a reflecting surface facing a respective area, one of said reflectors being formed to receive an unreflected beam of radiant energy in a substantially single direction from one of said areas and to reflect an annular portion of said beam to the other of said reflectors, the other of said reflectors being formed to reflect said annular beam in a substantially single direction to said other area, each of said reflectors having a central opening therein through which said beam is directed and each further having its respective reflecting surface for reversing the annular portion of the beam therebetween positioned with respect to the optical axis of the system such that the annular beam reflected from one reflecting surface to the other will have a maximum cross-sectional dimension, at a plane intermediate said reflecting surfaces, which is larger than the maximum cross sectional dimension, in said plane, of those portions of the beam which pass between said respective reflecting surfaces and said areas, and opaque contoured masking means positioned on the optical axis intermediate said two reflectors for masking out the major portion of the center of the beam which would pass directly without reflection from one area to the other.

4. An optical system for projecting light rays from an object area to an image area comprising a substantially flat mirror disposed adjacent one of said areas and having its reflective surface directed toward the other of said areas, an apertured concave spherical mirror spaced from said flat mirror and having its concave reflective surface directed toward said flat mirror, a correcting element substantially axially aligned with the aperture in said spherical mirror and positioned adjacent the vertex of the concave reflecting surface thereof for intercepting and correcting light rays passing through said aperture, and opaque contoured baffle means positioned on the optical axis in the space between said mirrors for masking out the major portion of the center of said light rays which would pass directly without reflection from one of said areas to the other area.

5. An optical system comprising a substantially flat apertured mirror, an apertured concave spherical mirror axially spaced from said flat mirror and with its concave surface directed toward said flat mirror for reflecting light rays entering the system through the aperture in the flat mirror onto said flat mirror, said flat mirror reflecting said light rays through the aperture in said spherical mirror, and a correcting lens substantially axially aligned with the aperture in said spherical mirror and positioned adjacent the vertex of the concave reflecting surface thereof for intercepting and correcting the light rays passing through said aperture.

6. An optical system comprising a substantially flat apertured mirror, an apertured concave spherical mirror spaced from said flat mirror with its concave surface directed toward said flat mirror, a correcting lens substantially axially aligned with said aperture in said spherical mirror and positioned adjacent the vertex of the concave reflecting surface thereof for intercepting and correcting light rays passing through said aperture, and an opaque circular baffle of controlled diameter interposed on the optical axis between said flat mirror and said spherical mirror for preventing direct transmission of light rays through the said apertures in the respective mirrors.

7. An optical system comprising a substantially flat apertured mirror, an apertured concave spherical mirror spaced from said flat mirror and with its concave reflecting surface toward said flat mirror for reflecting light rays entering the system through the aperture in the flat mirror onto said flat mirror, said flat mirror reflecting said light rays through the aperture in said spherical mirror, a correcting lens substantially axially aligned with said aperture in said spherical mirror and positioned adjacent the vertex of the concave reflecting surface thereof for intercepting and correcting the light rays passing through said aperture, and an opaque circular baffle of controlled diameter interposed on the optical axis between said flat mirror and said spherical mirror for preventing direct transmission of light rays through the said apertures in the respective mirrors.

8. An optical system for projecting light rays from an object area to a receiving area comprising a substantially flat apertured mirror disposed adjacent one of said areas and having its reflective surface directed toward the other of said areas, an apertured concave spherical mirror having its reflective surface directed toward said flat mirror, a correcting element substantially axially aligned with the aperture in said spherical mirror and positioned adjacent the vertex of the reflecting surface thereof for intercepting and correcting light rays passing through said aperture, and opaque contoured baffle means so positioned on the optical axis between said mirrors as to prevent passage of a major part of the central position of the light rays passing from the aperture in one of said mirrors directly to the aperture in the other mirror while permitting the passage of light between the aperture in one mirror and the reflecting surface of the other mirror.

9. An optical system for projecting a clear enlarged image of an object area upon an image receiving area located a predetermined distance therefrom comprising a substantially flat apertured mirror located adjacent said object area and having its reflective surface directed toward said image receiving area, an apertured concave spherical mirror located between said flat mirror and image receiving area and having its reflective surface directed toward said flat mirror in spaced relation thereto, a correcting element substantially axially aligned with the aperture in said spherical mirror and positioned adjacent the vertex of the reflecting surface thereof for intercepting and correcting the light rays passing through said aperture, and an opaque contoured baffle of a size and so positioned on the optical axis between said mirrors as to prevent transmission of the major portion of unreflected light rays from said object area directly to said image receiving area while permitting the passage of light rays between the aperture in one mirror and the reflecting surface of the other mirror..

10. An optical system for projecting a clear enlarged image of an object area upon an image area located a predetermined distance therefrom comprising a pair of spaced mirrors intermediately disposed between said areas, one embodying a substantially flat apertured mirror substantially coaxial with said object area and positioned in spaced relationship therewith and having its reflective surface directed toward said image area, and the other embodying an apertured concave spherical mirror substantially coaxial with said flat mirror and object area and located in spaced relation with said flat mirror between said flat mirror and image area and having its reflective surface directed toward said flat mirror, and a Schmidt type correcting element positioned within the aperture in said spherical mirror and having its flat surface directed toward said object area and located substantially at the vertex of the reflecting surface of the spherical mirror for intercepting and correcting light rays passing through said aperture toward said image area.

11. An optical system for projecting a clear enlarged image of an object area upon an image area located a predetermined distance therefrom comprising a substantially flat apertured mirror substantially coaxial with said object area and positioned in spaced relationship therewith and having its reflective surface directed toward said image area, an apertured concave spherical mirror substantially coaxial with said flat mirror and object area and located in spaced relation with said flat mirror between said flat mirror and image area and having its reflective surface directed toward said flat mirror, a Schmidt type correcting element positioned within the aperture in said spherical mirror and having its flat surface directed toward said object area and located substantially at the vertex of the reflecting surface of the spherical mirror for intercepting and correcting light rays passing through said aperture toward said image area, and opaque contoured baffle means disposed between said mirrors and coaxial therewith, said baffle means being of a size and shape and so positioned as to mask out the major portion of the center of said light rays which would pass directly without reflection from one of said areas to the other area while permitting passage of light rays between the apertures of one mirror and the reflecting surface of the other.

12. An optical system for projecting a clear enlarged image of an object area upon an image plane located a predetermined distance therefrom comprising a substantially flat apertured mirror substantially coaxial with said object area and positioned in spaced relationship therewith and having its reflective surface directed toward said image area, an apertured concave spherical mirror substantially coaxial with said flat mirror between said flat mirror and image area and having its reflective surface directed toward said flat mirror, and an opaque circular baffle of controlled diameter located substantially coaxial with said mirrors and object area and so positioned intermediate said mirrors as to prevent direct unreflected transmission of a major portion of the light rays from said object area to said image area while permitting passage of light rays between the aperture of one mirror and the reflecting surface of the other.

13. A reflective optical system for projecting an enlarged image of an object area upon an image area located a predetermined distance therefrom comprising a flat apertured mirror located on the axis of said system adjacent said object area, an apertured convergent mirror lens located on the axis of the system between said flat mirror and image area and at a predetermined distance from said flat mirror, the concave side of said mirror lens being directed toward said flat mirror and spaced therefrom, correcting means axially aligned with said system for intercepting and correcting light rays passing through the aperture in said mirror lens, said correcting means embodying a convergent lens and a divergent lens located in adjacent spaced relationship, said divergent lens being positioned adjacent the vertex of the reflecting surface of the mirror lens, and opaque contoured baffle means positioned on the optical axis between said mirrors to mask out the major portion of the center of said light rays which would pass directly without reflection from one of said areas to the other area while permitting passage of light rays between the aperture of one mirror and the reflecting surface of the other.

14. A reflective optical system for projecting an enlarged image of an object area upon an image area located a predetermined distance therefrom comprising a flat apertured mirror located on the axis of said system adjacent said object area, an apertured convergent mirror lens located on the axis of the system between said flat mirror and image area and at a predetermined distance from said flat mirror, the concave side of said mirror lens being directed toward said flat mirror, and an opaque contoured baffle of controlled diameter located substantially coaxial with the axis of said mirrors and object area and positioned between said mirrors to prevent direct unreflected transmission of a major portion of the light rays from said object area to said image area while permitting passage of light rays between the aperture of one mirror and the annular reflecting surface of the other.

15. A reflective optical system for projecting an enlarged image of an object area upon an image area located a predetermined distance therefrom comprising a flat apertured mirror located on the axis of the system adjacent said object area and having its reflective surface directed toward said image area, an apertured concave spherical mirror located on the axis of the system between said flat mirror and said image area with its reflective surface directed toward said object area, and a refractive correcting element positioned within the aperture in said spherical mirror for intercepting and correcting light rays passing through said aperture, said refractive correcting element having the character of a weak meniscus lens having a spherical refractive surface, said lens being disposed with its convex surface directed toward said object area.

References Cited in the file of this patent

UNITED STATES PATENTS

| Number | Name | Date |
| --- | --- | --- |
| 2,141,884 | Sonnefeld | Dec. 27, 1938 |
| 2,170,979 | Straubel | Aug. 29, 1939 |
| 2,295,779 | Epstein | Sept. 15, 1942 |
| 2,350,112 | Houghton | May 30, 1944 |
| 2,380,887 | Warmisham | July 31, 1945 |
| 2,403,660 | Hayward | July 9, 1946 |
| 2,413,286 | Buchele | Dec. 31, 1946 |
| 2,477,331 | Epstein | July 26, 1949 |
| 2,520,634 | Grey | Aug. 29, 1950 |

FOREIGN PATENTS

| Number | Country | Date |
| --- | --- | --- |
| 544,694 | Great Britain | Apr. 23, 1942 |